United States Patent
Liu et al.

(10) Patent No.: US 8,725,115 B2
(45) Date of Patent: May 13, 2014

(54) METHOD AND SYSTEM FOR PROCESSING MESSAGE

(75) Inventors: Qingquan Liu, Shenzhen (CN); Lixin Hu, Shenzhen (CN); Yang Wang, Shenzhen (CN); Weihua Yin, Shenzhen (CN); Ning Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1188 days.

(21) Appl. No.: 12/617,288

(22) Filed: Nov. 12, 2009

(65) Prior Publication Data

US 2010/0056110 A1  Mar. 4, 2010

Related U.S. Application Data

(63) Continuation of application No. PCT/CN2008/073729, filed on Dec. 25, 2008.

(30) Foreign Application Priority Data

Dec. 25, 2007  (CN) .......................... 2007 1 0304187

(51) Int. Cl.
*H04L 12/58* (2006.01)
*H04W 4/00* (2009.01)
*H04B 7/00* (2006.01)

(52) U.S. Cl.
USPC ........ 455/412.1; 455/466; 455/518; 711/170; 370/329

(58) Field of Classification Search
USPC ......... 455/412.1, 466, 518; 370/329; 711/170
See application file for complete search history.

(56) References Cited

U.S. PATENT DOCUMENTS

| | | | |
|---|---|---|---|
| 6,519,472 B1 * | 2/2003 | Brennan et al. | 455/518 |
| 7,089,320 B1 | 8/2006 | Biederman et al. | |
| 7,395,078 B2 * | 7/2008 | Roth | 455/466 |
| 7,565,506 B2 * | 7/2009 | Chen et al. | 711/170 |
| 8,073,473 B2 * | 12/2011 | Huggett | 455/466 |
| 8,081,993 B2 * | 12/2011 | Roth | 455/466 |

(Continued)

FOREIGN PATENT DOCUMENTS

| CN | 1303136 A | 7/2001 |
|---|---|---|
| CN | 1770895 A | 5/2006 |

(Continued)

OTHER PUBLICATIONS

European Search Report issued in corresponding European Patent Application No. 08868905.4, mailed Oct. 27, 2010.

(Continued)

*Primary Examiner* — William D Cumming
(74) *Attorney, Agent, or Firm* — Brinks Gilson & Lione (57) ABSTRACT

A message processing method is provided. The method includes the following steps. A message containing flag information is received. The received message containing the flag information is identified. If the message is a real-time message, the message is sent. If the message is a non-real time message, the non-real time message sent from a sender is combined and sent. A message processing system and a message combining device are further provided. Through the method, the device, and the system, the real-time messages are immediately delivered to subscribers, various types of non-real time messages are combined, converted to one or more messages, and delivered to the subscribers according to time assigned by the subscribers, thereby clearing a message space, and preventing interference to the subscribers.

15 Claims, 7 Drawing Sheets

(56) References Cited

U.S. PATENT DOCUMENTS

| | | |
|---|---|---|
| 2003/0040300 A1 | 2/2003 | Bodic et al. |
| 2004/0266411 A1 | 12/2004 | Galicia et al. |
| 2010/0056110 A1* | 3/2010 | Liu et al. .................... 455/412.1 |
| 2010/0128680 A1* | 5/2010 | Coletti et al. ................. 370/329 |

FOREIGN PATENT DOCUMENTS

| | | |
|---|---|---|
| CN | 1809182 A | 7/2006 |
| CN | 101022342 A | 8/2007 |
| CN | 101212721 A | 7/2008 |
| CN | 101212721 B | 1/2011 |
| EP | 1 675 414 A1 | 6/2006 |
| WO | WO 03/024069 A1 | 3/2003 |

OTHER PUBLICATIONS

Short Message Peer to Peer Protocol Specification v3.4, Document Version Issue 1.2, Oct. 12, 1999.

Written Opinion of the International Searching Authority issued in corresponding PCT Application No. PCT/CN2008/073729; mailed Apr. 2, 2009.

Office Action issued in Chinese Patent Application No. 2007103041874; issued Feb. 12, 2010.

\* cited by examiner

METHOD AND SYSTEM FOR PROCESSING MESSAGE

CROSS-REFERENCE TO RELATED APPLICATIONS

The application is a continuation of International Application No. PCT/CN2008/073729, filed on Dec. 25, 2008, which claims priority to Chinese Patent Application No. 200710304187.4, filed on Dec. 25, 2007, both of which are hereby incorporated by reference in their entireties.

FIELD OF THE TECHNOLOGY

The present invention relates to the field of communication technology, and in particular, to a message processing method and system and a message combining device.

BACKGROUND OF THE INVENTION

With the development of times, communications among people become more frequent. Accordingly, as a basic telecommunication service of a mobile communication network, the short message service (SMS) is used more and more, and plays a quite important role in the life of people. Through the SMS, subscribers can deliver information and obtain other information, for example, stock quotations, weather information, and sports information.

As the SMS is used more frequently, the SMS brings much convenience to the life of the subscribers, but the short messages provided by various service providers/content providers (SP/CPs) are diversified, and the number of short messages received by the subscribers also becomes greater and greater, and sometimes even annoying to the subscribers. For example, shopping malls, enterprises, and various other SPs deliver too many advertisements and promotional messages to the subscribers irregularly. However, in the conventional processing method and device, all the messages are sent to the subscribers in time without identification, interfering the subscribers' normal work.

SUMMARY OF THE INVENTION

The embodiment of present invention provides a message processing method and system and a message combining device, so as to identify messages, immediately deliver real-time short messages to subscribers, and combine various types of non-real time short messages to one or more messages, thereby, by sorting out the large number of short messages, avoiding interference to the subscribers.

An embodiment of the present invention provides a message processing method, which includes the following steps:
receiving a message containing flag information;
identifying the received message according to the flag information;
if the message is a real-time message, sending the message;
if the message is a non-real time message, combining and sending the non-real time message received from senders.

Through the above method, various types of real-time short messages can be immediately delivered to subscribers. Various types of non-real time short messages are combined and then converted to one or more messages, and delivered to the subscribers, thereby avoiding interference to the subscribers by sorting out the short messages.

An embodiment of the present invention provides a message processing system, which includes an identifying unit, a combining unit, and a sending unit.

The identifying unit is configured to identify whether a received message containing flag information is a real-time message or a non-real time message.

The combining unit is configured to combine the identified non-real time message.

The sending unit is configured to send the real-time message, and to send the combined non-real time message at preset time.

Through the above system, various types of real-time messages can be immediately delivered to subscribers, and various types of non-real time messages are combined and converted to one or more messages, and delivered to the subscribers according to the time assigned by the subscribers, thereby avoiding interference to the subscribers.

An embodiment of the present invention further provides a message combining device, which includes an interface processing module, a service logic processing module, a message storage and management module, and a message conversion processing module.

The interface processing module is configured to receive a message containing flag information, and to send a real-time message and a combined non-real time message.

The service logic processing module is configured to identify the received message according to the flag information, in which when a value of the flag information is a preset value, the message is the real-time message and is sent by the interface processing module; when the value of the flag information is not the preset value, the message is the non-real time message.

The message storage and management module is configured to store the non-real time message.

The message conversion processing module is configured to combine the stored non-real time message, and to convert the stored non-real time message to one or more messages for being sent by the interface processing module.

Through the above device, various types of real-time messages can be immediately delivered to subscribers, and various types of non-real time messages are combined and converted to one or more messages, and delivered to the subscribers, thereby avoiding interference to the subscribers.

An embodiment of the present invention still further provides a message processing system, which includes a message processing unit and a message sending unit.

The message processing unit is configured to identify whether a received message containing flag information is a real-time message or a non-real time message, send the message if the received message is the real-time message, or combine the non-real time message and convert a format of the non-real time message to send if the received message is the non-real time message.

The message sending unit is configured to send the combined non-real time message.

Through the above system, real-time short messages can be immediately delivered to subscribers, and various types of non-real time short messages are combined, converted to one or more multimedia messages (MMs), and delivered to the subscribers according to the time assigned by the subscribers, thereby avoiding interference and bringing convenience to the subscribers.

The technical solutions of the present invention will be described in detail below with reference to the drawings and embodiments.

DETAILED DESCRIPTION OF THE INVENTION

Figure 1:
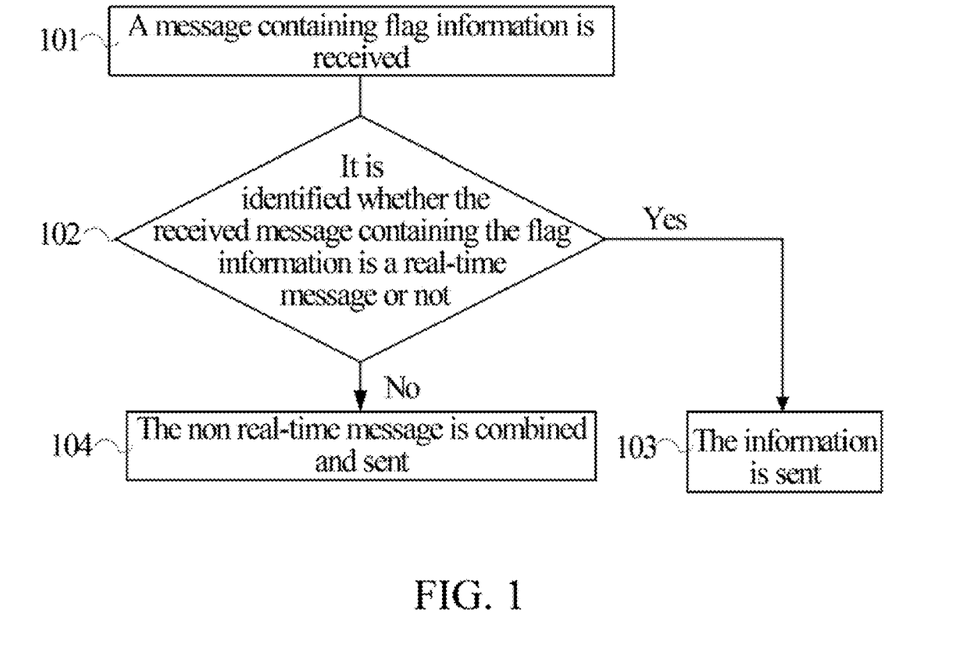
FIG. 1 is a flow chart of a message processing method according to an embodiment of the present invention.

FIG. 1 is a flow chart of a message processing method according to an embodiment of the present invention. Referring to FIG. 1, the method includes the following steps.

In Step 101, a message containing flag information is received.

The flag information may be a preset field. Here, the preset field is "schedule_delivery_time".

In Step 102, the received message containing the flag information is identified. If the message is a real-time message, the procedure proceeds to Step 103; otherwise, the procedure proceeds to Step 104.

Before the received message containing the flag information is identified, the following is included: determining whether the flag information in the message needs to be identified or not, that is, determining whether the preset field in the message needs to be identified or not; if yes, identifying the preset field of the received message is identified; when a value of the "schedule_delivery_time" field is NULL, determining that the message is the real-time message, and when the value of the "schedule_delivery_time" field is not NULL, determining that the message is a non-real time message.

In Step 103, the message is sent.

The real-time message is immediately delivered.

In Step 104, the non-real time message is combined and sent.

For the non-real time message, the non-real time message sent by a sender is stored, and then one or more messages are combined and sent according to preset time. After the non-real time messages are combined, the format of the messages is converted.

Through the method, various types of real-time short messages are immediately delivered to subscribers, and various types of non-real time messages are combined and converted to one or more messages, and then are delivered to the subscribers, thereby, by sorting out a large number of short messages, avoiding the interference to the subscribers.

Figure 2A:
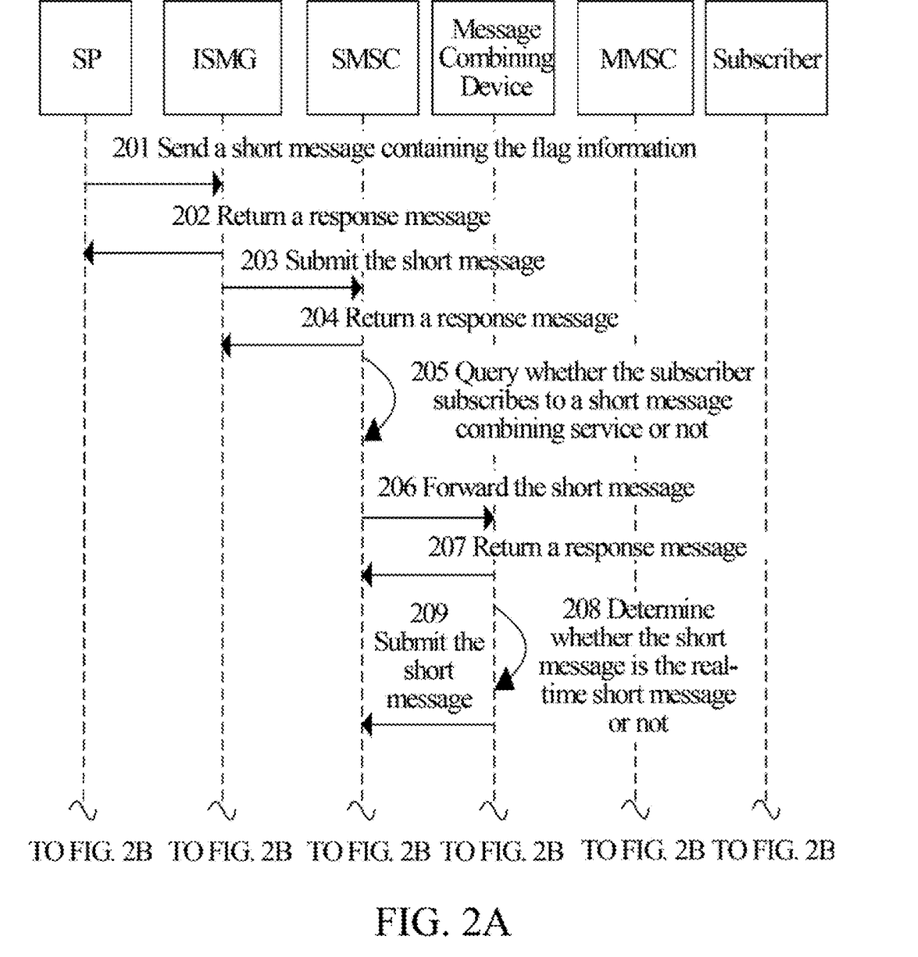
FIGS. 2A & 2B are a signaling flow chart of the message processing method according to the embodiment of the present invention.
Figure 2B:
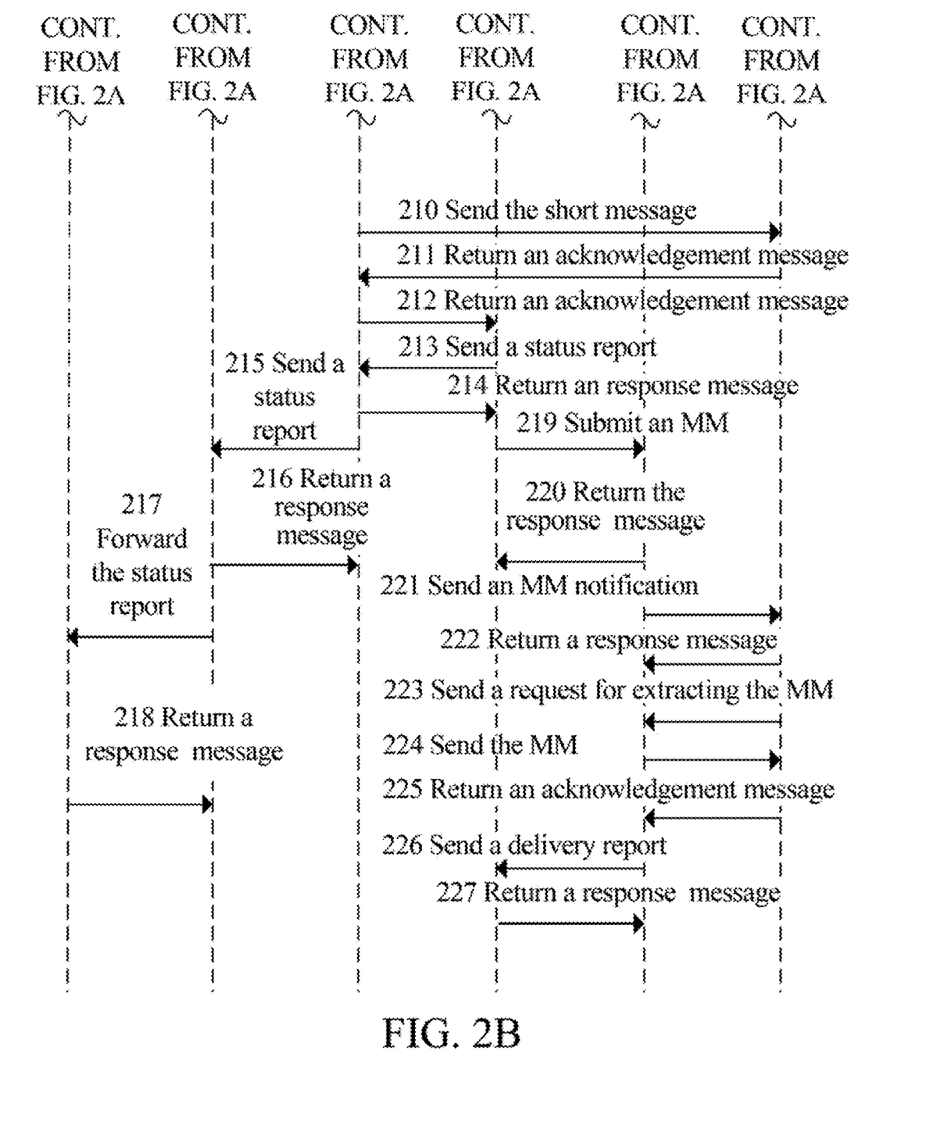

FIGS. 2A & 2B are a signaling flow chart of the message processing method according to an embodiment of the present invention. Referring to FIGS. 2A & 2B, short messages are taken as an example to illuminate the embodiment, a processing principle of combining other messages is the same as the principle of processing the short messages. The message processing method includes the following steps.

In Step 201, an SP delivers a message containing flag information to an Internet short message gateway (ISMG).

The message containing the flag information is a message in which a specific tag is set on a preset field for identification. Here, the preset field may be "schedule_delivery_time". For a short message that needs to be delivered in real time, a value filled in the field is NULL. For a short message that does not need to be delivered in real time, the value filled in the field is not NULL, the SP delivers the short message with the NULL tag or the non NULL tag in the "schedule_delivery_time" field to the ISMG.

In Step 202, the ISMG returns a response message.

After receiving the short message, the ISMG returns the response message to the SP.

In Step 203, the ISMG submits the short message to a short message service center (SMSC).

The ISMG submits the short message to the SMSC which the ISMG accesses.

In Step 204, the SMSC returns a response message.

After receiving the delivered short message, the SMSC returns the response message to the ISMG.

In Step 205, it is determined whether the preset field in the message needs to be identified or not. If yes, the procedure proceeds to Step 206; otherwise, the procedure proceeds to Step 209.

The SMSC queries whether the subscriber subscribes to a short message combining service or not, so as to determine whether the preset field in the message needs to be identified for querying. If the subscriber subscribes to the service, it indicates that the preset field in the message needs to be identified; otherwise, it indicates that the preset field in the message does not need to be identified. The subscriber may subscribe to the message combining service through a service message processing module in a message combining device or through other existing modes, for example, in an operation system or through a Web interface provided by the system.

In Step 206, the delivered short message is forwarded to the message combining device.

When the subscriber subscribes to the service, that is, when the SMSC needs to identify the "schedule_delivery_time" field contained in the message, the short message delivered by the SP is forwarded to the message combining device, and is subsequently processed by the message combining device.

In Step 207, the message combining device returns a response message.

The message combining device returns the response message to the SMSC.

In Step 208, the message combining device determines whether the short message is a real-time short message or a non-real time short message.

The message combining device processes the short message in the following way: if the value of the "schedule_delivery_time" field is NULL, determining that the short message is the real-time short message, which needs to be delivered in real time; if the value of the "schedule_delivery_time" field is not NULL, determining that the short message is the non-real time short message, which needs to be delivered on time set by the subscriber. When the short message is the real-time short message, the procedure proceeds to Step 209; when the short message is the non-real time short message, the procedure proceeds to Step 219.

In Step 209, when the short message is the real-time short message, the message combining device submits the short message to the SMSC.

In Step 210, the SMSC sends the short message to the subscriber.

The SMSC sends the short message to the subscriber through a wireless network.

In Step 211, the subscriber returns an acknowledgement message.

After receiving the short message sent from the SMSC, the subscriber returns the acknowledgement message to the SMSC through the wireless network.

In Step 212, the SMSC returns the acknowledgement message returned from the subscriber to the message combining device.

In Step 213, the message combining device generates a status report, and sends the status report to the SMSC.

In Step 214, the SMSC returns a response message to the message combining device.

In Step 215, the SMSC sends a status report to the ISMG.

In Step 216, the ISMG returns a status report response.

In Step 217, the ISMG forwards the status report to the SP.

After receiving the status report message sent from the SMSC, the ISMG determines whether to forward the status report to the SP or not according to requirements of the SP. If the SP requires the ISMG to forward the status report to the SP, the ISMG forwards the status report to the Sp. Thus, the SP knows that the short message is sent to the subscriber; otherwise, the ISMG does not need to forward the status report to the SP.

In Step 218, after receiving the status report sent from the ISMG; the SP returns a status report response to the ISMG.

In Step 209-Step 218, the short message delivered by the SP is the real-time short message, which is delivered to the subscriber.

In Step 219, when the short message is the non-real time short message, the message combining device combines the received non-real time short message, converts the combined non-real time short message to one or more MMs, and submits the MMs to a multimedia messaging service center (MMSC) at the time preset by the subscriber.

The message combining device stores all the received non-real time short messages, combines and converts all the non-real time short messages to one or more MMs, and finally submits the MMs to the MMSC through an MM7 interface. The preset time is subscribed in advance by the subscriber through the service message processing module in the message combining device. The subscriber may determine the preset time when subscribing to the message combining service, or separately determine and modify the preset time.

In Step 220, the MMSC returns a response message to the message combining device.

In Step 221, the MMSC sends an MM notification to the subscriber.

The MMSC sends the MM notification to a Wireless Application Protocol (WAP) gateway (GW), the WAP GW sends the MM notification to the SMSC, and the SMSC sends the MM notification to the subscriber.

In Step 222, the subscriber returns a notification response message to the MMSC.

In Step 223, the subscriber sends a request for retrieving the MM to the MMSC.

The subscriber sends the request for retrieving the MM to the WAP GW, and the WAP GW forwards the request for retrieving the MM to the MMSC.

In Step 224, the MMSC sends the MM to the subscriber.

The MMSC sends the MM to the WAP GW, and the WAP GW forwards the MM to the subscriber.

In Step 225, the subscriber returns an acknowledgement message to the MMSC.

After receiving the MM, the subscriber returns the acknowledgement message to the WAP GW, and the WAP GW forwards the acknowledgement message to the MMSC.

In Step 226, the MMSC sends a delivery report to the message combining device.

The MMSC sends the delivery report of the non-real time short messages sent from the SP and received by the subscriber to the message combining device.

In Step 227, the message combining device returns a response message.

The message combining device returns the response message to the MMSC. In Step 219-Step 227, the message combining device combines the non-real time short messages, converts the non-real time short messages to one or more MMs, and then delivers the MMs to the subscriber.

In addition to the SMSC, the ISMG may also query whether the subscriber subscribes to the message processing service or not. After receiving the short messages delivered by the SP, the ISMG queries whether the subscriber subscribes to the service or not. When it is found that the subscriber subscribes to the service, the ISMG directly sends the short messages to the message combining device, such that the process of sending the short message from the ISMG to the SMSC is omitted. The subsequent operation is the same as that of the above description.

Through the method, the real-time short messages are immediately delivered to the subscribers, the various types of non-real time short messages are combined and converted to one or more MMs, and delivered to the subscribers according to the time assigned by the subscribers, thereby avoiding interference of a large number of messages on the subscribers, and bringing great convenience to the subscribers.

Figure 3:
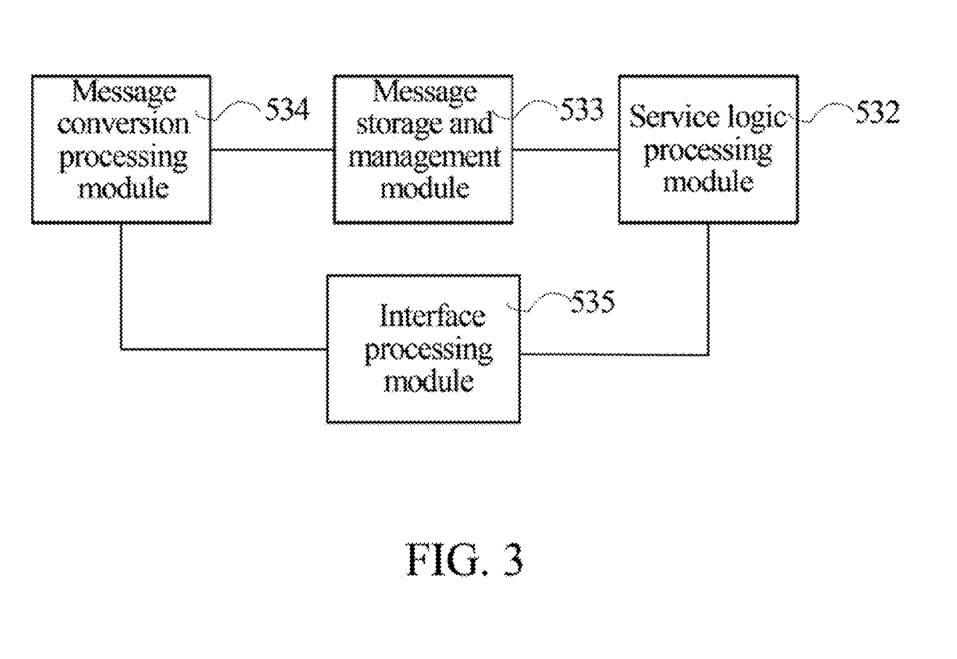
FIG. 3 is a schematic block diagram of a message combining device according to an embodiment of the present invention.

FIG. 3 is a schematic block diagram of a message combining device according to an embodiment of the present invention. Referring to FIG. 3, the message combining device includes an interface processing module 535, a service logic processing module 532, a message storage and management module 533, and a message conversion processing module 534. The interface processing module 535 is configured to receive a message containing flag information and is configured to send a real-time message and a combined non-real time message. The service logic processing module 532 is configured to identify the received message containing the flag information, and when a value of the flag information is a preset value, the message is the real-time message, and is sent from the interface processing module 535, and when the value of the flag information is not the preset value, the message is the non-real time message. The message storage and management module 533 is configured to store the non-real time message. The message conversion processing module 534 is configured to combine the stored non-real time message, and convert the stored non-real time message to one or more messages for being sent from the interface processing module 535.

After receiving a short message sent from an SP, an SMSC or an ISMG determines whether a preset field contained the message needs to be identified or not. If yes, the SMSC or the ISMG sends the short message sent from the SP to the message combining device. The service logic processing module of the message combining device analyzes the short message from the SMSC or the ISMG, and parses a value of a "schedule_delivery_time" field in the short message. If the value of the "schedule_delivery_time" field is NULL, the short message is sent back to the SMSC through the interface processing module, and is delivered in real time by the SMSC. If the value of the "schedule_delivery_time" field is not NULL, the short message is sent to the message storage and management module for storage. Then, the short messages received by the subscriber are combined to one or more NIMs by the message conversion processing module, and finally the MMs are sent to the subscriber through the interface processing module according to delivery time set by the subscriber.

Through the device, the real-time short messages sent from the SP are delivered to the subscribers in real time, and the non-real time short messages sent from the SP are combined, converted to one or more MMs, and then delivered to the subscribers according to the time set by the subscribers, thereby reducing the number of the short messages received by the subscribers, and avoiding interference of a large number of short messages on the subscribers.

Figure 4:
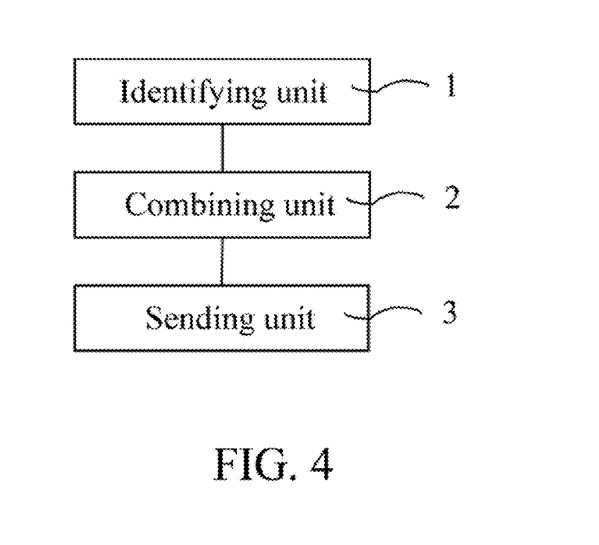
FIG. 4 is a schematic block diagram of a message processing apparatus according to an embodiment of the present invention.

FIG. 4 is a schematic block diagram of a message processing apparatus according to an embodiment of the present invention. Referring to FIG. 4, the message processing apparatus includes an identifying unit 1 configured to identify whether a received message containing flag information is a real-time message or a non-real time message, a combining unit 2 configured to combine the identified non-real time message, and a sending unit 3 configured to send the real-time message and send the combined non-real time message at preset time.

In addition, in order to combine various types of non-real time messages, the non-real time messages need to be stored. Therefore, the apparatus further includes a storage unit configured to store the identified non-real time message for being combined by the combining unit, and a conversion unit configured to convert a format of the combined message for being sent by the sending unit.

In the apparatus, the identifying unit identifies whether the received message containing the flag information is the real-time message or the non-real time message. If the received message containing the flag information is the real-time message, the sending unit sends the real-time message to the subscriber. If the received message containing the flag information is the non-real time message, the storage unit stores the non-real time message, the combining unit combines the non-real time message, and the conversion unit converts the format of the combined message. After the combined message is converted to one or more MMs, the sending unit sends the MMs to the subscriber at the time assigned by the subscriber.

Through the apparatus, real-time short messages are immediately delivered to the subscribers, various types of non-real time short messages are combined, converted to one or more messages, and delivered to the subscribers according to the time assigned by the subscribers, thereby avoiding interference of a large number of messages on the subscribers.

Figure 5:
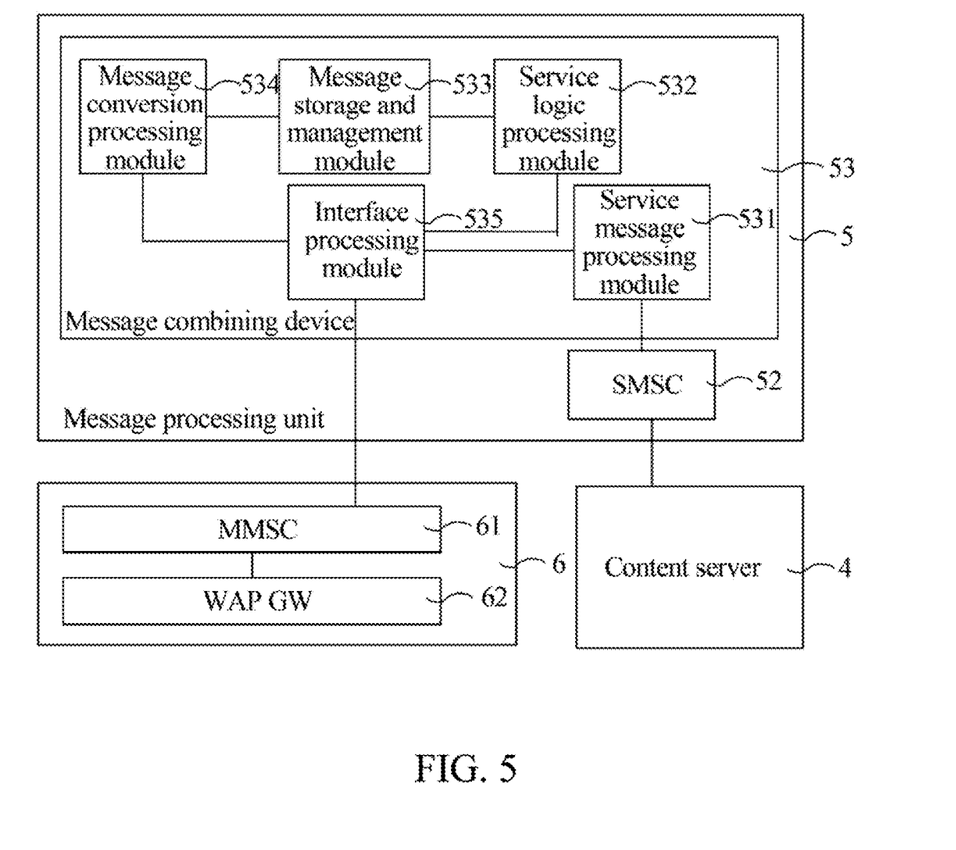
FIG. 5 is a schematic block diagram of a message processing system according to another embodiment of the present invention.

FIG. 5 is a schematic block diagram of a message processing system according to another embodiment of the present invention. Referring to FIG. 5, the message processing system includes a content server 4, a message processing unit 5, and a message sending unit 6. The content server 4 is configured to send a message containing flag information. The message processing unit 5 is configured to identify whether the received message containing the flag information is a real-time message or a non-real time message, in which if the received message is the real-time message, the message processing unit 5 sends the message, and if the received message is the non-real time message, the message processing unit 5 combines the non-real time message, converts a format of the non-real time message, and sends the non-real time message. The message sending unit 6 is configured to send the received combined non-real time message at preset time.

The message containing the flag information sent from the content server 4 is a short message. The message processing unit 5 includes an SMSC 52 and a message combining device 53. The SMSC 52 is configured to determine whether the flag information in the short message needs to be identified or not. If yes, the SMSC 52 forwards the short message. The message combining device 53 is configured to identify whether the received short message is the real-time short message or the non-real time short message. If the received short message is the non-real time short message, the message combining device 53 combines the non-real time short message to MMs and sends the MMs. The message combining device 53 further includes a service logic processing module 532, a message storage and management module 533, a message conversion processing module 534, and an interface processing module 535. The interface processing module 535 is configured to receive the message containing the flag information sent from the SMSC 52, and is configured to send the real-time message and the combined non-real time message. The service logic processing module 532 is configured to identify the received message containing the flag information. When a value of the flag information is a preset value, the message is the real-time message, and is sent to the SMSC 52 through the interface processing module 535. When the value of the flag information is not the preset value, the message is the non-real time message. The message storage and management module 533 is configured to store the non-real time message. The message conversion processing module 534 is configured to combine the stored non-real time message, and convert the stored non-real time message to one or more messages for being sent to the message sending unit 6 from the interface processing module 535. In addition, in order to handle a process that the subscriber subscribes to a message combining service, the message combining device 53 further includes a service message processing module 531 configured to save the message containing the flag information in the short message that needs to be identified, and send the message to the SMSC 52 through the interface processing module. The saved message containing the flag information in the short message that needs to be identified further includes information about timing of receiving the message preset by the subscriber.

The service message processing module 531 saves the message containing the flag information in the short message that needs to be identified, and sends the message to the SMSC 52 through the interface processing module. The SMSC 52 determines whether to identify the flag information in the short message according to the message sent by the service message processing module. If yes, the short message is forwarded to the service logic processing module 532 through the interface processing module. The service logic processing module analyzes the short message from the SMSC or the ISMG, and parses a value of a "schedule_delivery_time" field in the short message. If the value of the "schedule_delivery_time" field is NULL, the short message is sent back to the SMSC 52 through the interface processing module 535, and is delivered in real time by the SMSC 52. If the value of the "schedule_delivery_$_n$time" field is not NULL, the short message is sent to the message storage and management module 533 for storage. Then, the short messages received by the subscriber are combined to one or more MMs by the message conversion processing module 534, and finally the MMs are sent to the message sending unit 6 through the interface processing module 535.

The message processing unit 5 combines the non-real time message to the MMs. The message sending unit 6 further includes an MMSC 61 configured to receive and forward the MMs sent from the message processing unit, and a WAP GW 62 configured to receive and forward the MMs sent from the MMSC.

The content server serves as an SP, and the SP interacts with the ISMG through a Short Message Peer-to-Peer Protocol (SMPP), so as to provide various types of short message services and content services to the subscribers. The ISMG supports a process for transceiving SMS messages. In the system, the ISMG forwards the messages between the SP and the subscribers. The SMSC is an SMS processing platform configured to store, process, and transfer the short messages. The message combining device combines the short messages delivered by the SP to the subscribers, converts the short messages to one or more MMs, and delivers the MMs to the MMSC at the time assigned by the subscribers. The MMSC is a multimedia messaging service (MMS) processing platform configured to store, process, and deliver the MMs. The WAP GW is a GW device for the subscribers to access the MMSC.

The SP firstly sends the short message to the ISMG through the SMPP protocol, the ISMG sends the short message to the SMSC through the SMPP protocol, and the SMSC determines whether a preset field in the short message needs to be identified or not. If yes, the short message is forwarded to the message combining device, and the service logic processing module of the message combining device determines what the delivered short message is. If the delivered short message is the real-time short message, the SMSC immediately delivers the short message to the subscriber. If the delivered short message is the non-real time short message, the short message sent from the SP is forwarded to the message storage and management module of the message combining device, and the delivered message is stored by the message storage and management module of the message combining device, combined and converted to one or more MMs by the message conversion processing module, sent to the MMSC, and sent to the subscriber by the MMSC through the WAP GW.

In the system, after the SP sends the short message to the ISMG, the ISMG may also determine whether the preset field in the short message needs to be identified or not. If yes, the short message is forwarded to the message combining device, the delivered short message is identified by the message combining device, and the subsequent operation is the same as the above description.

Through the system, the real-time short messages are immediately delivered to the subscribers, the various types of non-real time short messages are converted to one or more MMs, and delivered to the subscribers according to the time assigned by the subscribers, thereby avoiding interference to the subscribers by sorting out the short messages, such that the subscribers receive the message services of the SP at the acceptable time, and the SP is not complained or set to be receive-disabled by the subscribers, thereby achieving win-win between the SP and the subscribers.

Figure 6:
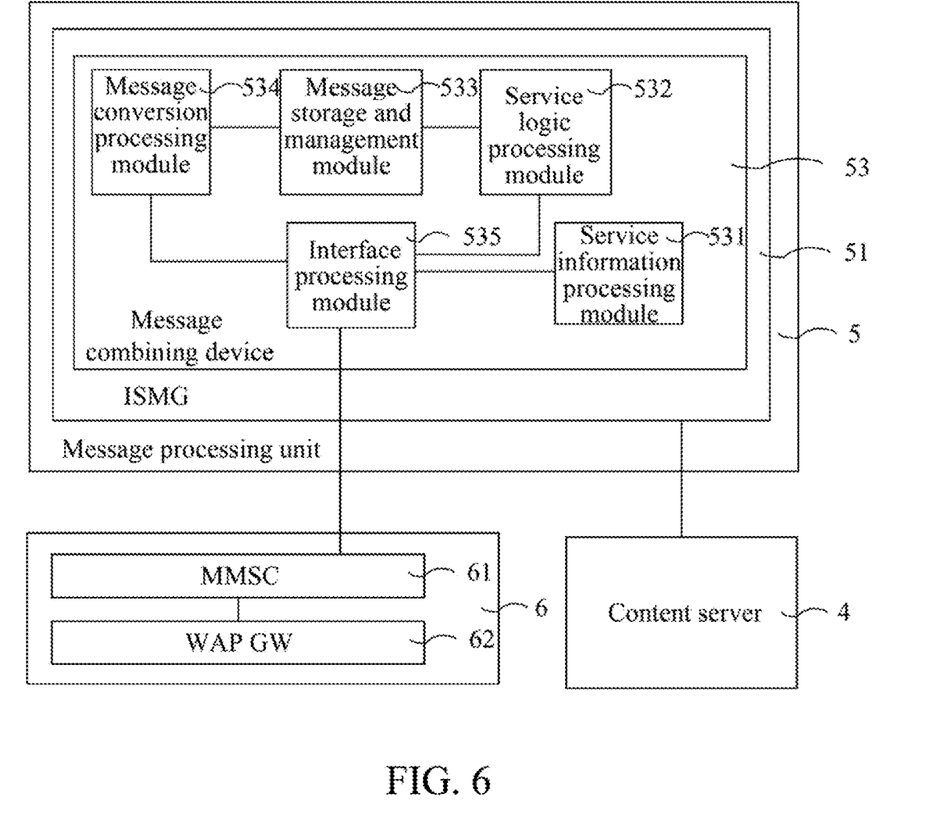
FIG. 6 is a schematic block diagram of a message processing system according to still another embodiment the present invention.

FIG. 6 is a schematic block diagram of the message processing system according to still another embodiment of the present invention. Referring to FIG. 6, a difference between this message processing system and the message processing system according to the first embodiment is that the message combining device 53 is located in an ISMG 51, and the ISMG 51 accomplishes functions of the message combining device and the above mentioned SMSC.

An SP firstly sends a short message to the ISMG through an SMPP protocol, the ISMG determines whether a preset field in the message needs to be identified or not. If yes, the message combining device in the ISMG performs determination on the delivered short message. If the delivered short message is a real-time short message, the ISMG immediately sends the short message to the SMSC, and the SMSC immediately delivers the real-time short message to the subscriber. If the delivered short message is the non-real time short message, the short message delivered is stored, combined, and converted to one or more MMs by the message combining device. The MMs are sent to the MMSC, and sent to the subscriber by the MMSC through a WAP GW.

In the system, after the SP sends the short message to the ISMG, the ISMG may also send the short message to the SMSC, and the SMSC determines whether the preset field in the message needs to be identified or not. If yes, the short message is forwarded to the message combining device in the ISMG, the delivered short message is identified by the message combining device, and the subsequent operation is the same as the above description.

Through the system, the real-time short messages are immediately delivered to the subscribers, the various types of non-real time short messages are combined and converted to one or more MMs, and delivered to the subscribers according to the time assigned by the subscribers, thereby clearing an information space, and avoiding the interference of a large number of short messages to the subscribers.

Figure 7:
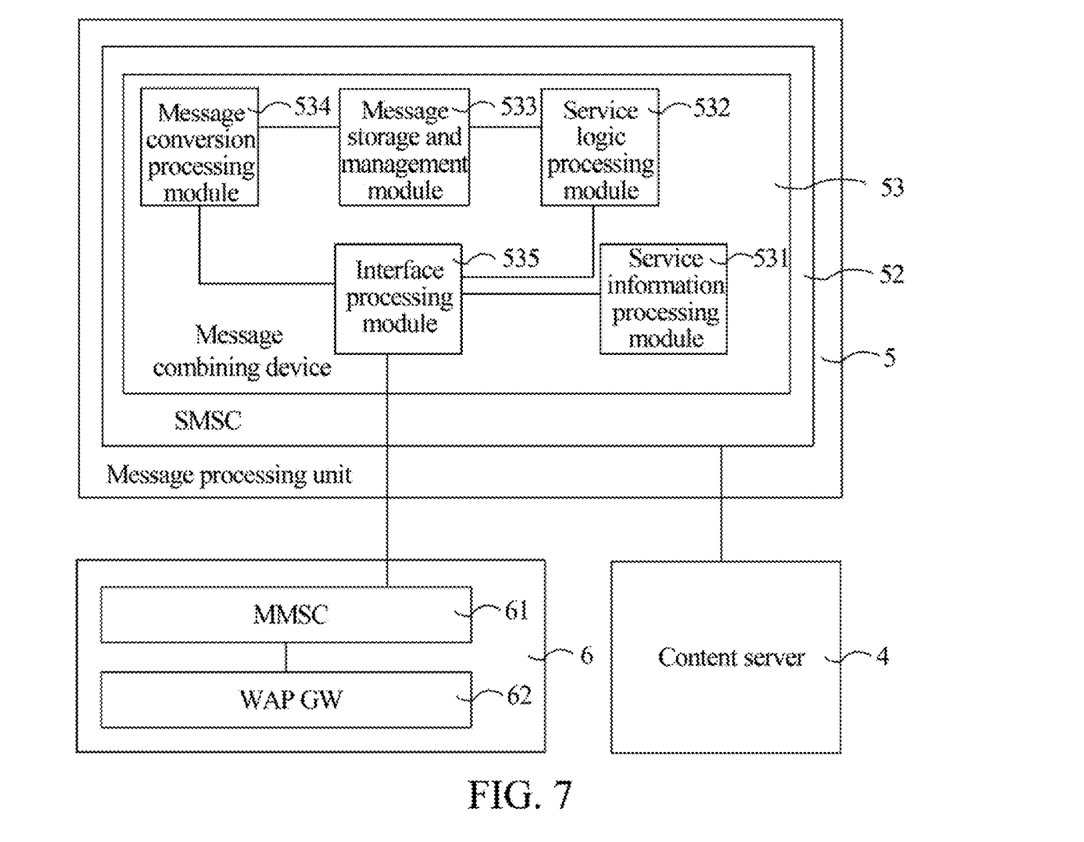
FIG. 7 is a schematic block diagram of a message processing system according to yet another embodiment the present invention.

FIG. 7 is a schematic block diagram of the message processing system according to yet another embodiment of the present invention. Referring to FIG. 7, a difference between this message processing system and the message processing system in the embodiments of FIGS. 5 and 6 lies in that a message combining device 53 is located in an SMSC 52.

An SP firstly sends a short message to the ISMG through an SMPP protocol, the ISMG determines whether a preset field in the message needs to be identified or not. If yes, the ISMG forwards the short message to the SMSC, and the message combining device in the SMSC performs determination on the delivered short message. If the delivered short message is a real-time short message, the SMSC immediately delivers the real-time short message to the subscriber. If the delivered short message is a non-real time short message, the message combining device combines and converts the delivered short message to one or more MMs, and generates and returns a status report to the ISMG. If the SP requires the report, the ISMG sends the report to the SP. Then, the MMs are sent to the MMSC, and are sent to the subscriber by the MMSC through a WAP GW.

In addition, in above system, after the SP sends the short message to the ISMG, the ISMG may also send the short message to the SMSC, and the SMSC determines whether the preset field in the message needs to be identified or not. If yes, the delivered short message is determined by the message processing unit of the SMSC, and the subsequent operation is the same as the above description.

Through the system, the real-time short messages are immediately delivered to the subscribers, the various types of non-real time short messages are combined and converted to one or more MMs, and delivered to the subscribers according to the time assigned by the subscribers, thereby clearing a message space, and preventing interference of a large number of short messages to the subscribers.

In addition, software for implementing the embodiments of the present invention may be stored in a computer readable storage medium. When the software is implemented, the procedure includes the following steps. The message containing the flag information is receive, and then the received message containing the flag information is identified. If the message is the real-time message, the message is sent. If the message is the non-real time message, the non-real time message sent by a sender is combined and sent. The storage medium may be a ROM/RAM, a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the scope of the present invention.

What is claimed is:

1. A message processing method implemented by a message combining device, comprising:
   receiving a message containing flag information;
   identifying the received message according to the flag information;
   determining that the message is a real-time message when a value of the flag information is a preset value, sending the message;
   determining that the message is a non-real time message when the value of the flag information is not the preset value, storing the non-real time message, and combining the stored non-real time message, and converting the non-real time messages to one or more multimedia messages and sending the multimedia messages.

2. The method according to claim 1, wherein before identifying the received message according to the flag information, the method further comprises:
   determining whether the flag information in the message needs to be identified or not by determining whether a subscriber subscribes to a message combining service or not;
   determining that the flag information need to be identified, performing the step of identifying the received message according to the flag information;
   determining that the flag information need not to be identified, sending the message.

3. The method according to claim 1, wherein the sending the multimedia messages comprises:
   sending the converted multimedia messages according to a preset time.

4. The method according to claim 3, wherein the converting non-real time messages to one or more multimedia messages comprises: converting the format of the combined messages.

5. The method according to claim 3, wherein the preset time to send the combined messages is determined when subscribing to the message combining service.

6. A message combining device, comprising:
   an interface processing module configured to receive a message containing flag information, and to send a real-time message and one or more multimedia messages converted from non-real time messages;
   a service logic processing module, configured to identify the received message according to the flag information, wherein, when a value of the flag information is a preset value, the message is the real-time message and is sent by the interface processing module; when the value of the flag information is not the preset value, the message is the non-real time message;
   a message storage and management module, configured to store the non-real time message; and
   a message conversion processing module, configured to combine the stored non-real time message, and to convert the stored non-real time messages to one or more multimedia messages for being sent by the interface processing module.

7. The message combining device according to claim 6, wherein the interface processing module sending the one or more multimedia messages converted from the non-real time message is provided by sending the combined messages according to a preset time determined when the subscriber subscribes to the message combining service.

8. A message processing system, comprising:
   a message processing unit configured to identify whether a received message containing flag information is a real-time message or a non-real time message according to the flag information, determine that the message is a real-time message when a value of the flag information is a preset value, send the message when the received message is the real-time message; determine that the message is a non-real time message when the value of the flag information is not the preset value, store the non-real time message, and combine the non-real time messages and convert the non-real time messages to one or more multimedia messages; and
   a message sending unit configured to send the multimedia messages.

9. The system according to claim 8, wherein the message containing the flag information received by the message processing unit is a short message, and the message processing unit comprises:
   a short message service center, SMSC or an Internet short message gateway, ISMG (51), configured to determine whether the flag information in the short message needs to be identified or not, if yes, the SMSC or the ISMG forwards the short message to a message combining device;
   a message combining device, configured to identify whether the received short message is the real-time short message or the non-real time short message, if the received short message is the non-real time short message, to combine and convert the non-real time short message to multimedia messages, MMs, and send the MMs.

10. The system according to claim 8, wherein the message combining device comprises:
    an interface processing module, configured to receive a message containing flag information sent from the SMSC, and to send a real-time message and a combined non-real time message;
    a service logic processing module, configured to identify the received message according to the flag information, wherein, when a value of the flag information is a preset value, the message is the real-time message and is sent to the SMSC through the interface processing module; when the value of the flag information is not the preset value, the message is the non-real time message;
    a message storage and management module, configured to store the non-real time message; and
    a message conversion processing module, configured to combine the stored non-real time message, and to convert the stored non-real time message to one or more messages for being sent to the message sending unit from the interface processing module.

11. The system according to claim 9, wherein the message combining device further comprises a service message processing module, configured to save the message containing the flag information that needs to be identified, and send the message to the SMSC or the ISMG through the interface processing module.

12. The system according to claim 8, wherein the message received by the message processing unit is a short message, the message processing unit comprises:
 a short message service center, SMSC, where the message combining device is located, wherein the SMSC is configured to determine whether the flag information in the short message needs to be identified or not, if yes, identify whether the received short message is a real-time message or a non-real time message, if the received message is the non-real time message, combine the non-real time short message to multimedia messages, MMs, and send the MMs.

13. The system according to claim 8, wherein the message received by the message processing unit is a short message, the message processing unit comprises:
 an Internet short message gateway, ISMG, where the message combining device is located, wherein the ISMG is configured to determine whether the flag information in the short message needs to be identified or not, if yes, identify whether the received short message is a real-time message or a non-real time message, if the received message is the non-real time message, combine the non-real time short message to multimedia messages, MMs, and send the MMs.

14. The system according to claim 8, wherein the message processing unit converts the non-real time message to MMs, the message sending unit further comprises:
 a multimedia messaging service center, MMSC, configured to receive and forward the MMs sent from the message processing unit;
 a Wireless Application Protocol gateway, WAP GW, configured to receive and forward the MMs sent from the MMSC.

15. The system according to claim 8, wherein the message sending unit sending the combined non-real time message is provided by sending the combined messages according to a preset time which is determined when the subscriber subscribes to the message combining service.

* * * * *